(12) United States Patent
Graziosi et al.

(10) Patent No.: US 11,348,285 B2
(45) Date of Patent: May 31, 2022

(54) MESH COMPRESSION VIA POINT CLOUD REPRESENTATION

(71) Applicant: SONY CORPORATION, Tokyo (JP)

(72) Inventors: Danillo Graziosi, San Jose, CA (US); Ohji Nakagami, Tokyo (JP); Alexandre Zaghetto, San Jose, CA (US); Ali Tabatabai, Cupertino, CA (US)

(73) Assignee: Sony Group Corporation, Tokyo (JP)

(*) Notice: Subject to any disclaimer, the term of this patent is extended or adjusted under 35 U.S.C. 154(b) by 157 days.

(21) Appl. No.: 16/859,059

(22) Filed: Apr. 27, 2020

(65) Prior Publication Data

US 2021/0174551 A1 Jun. 10, 2021

Related U.S. Application Data

(60) Provisional application No. 62/946,194, filed on Dec. 10, 2019.

(51) Int. Cl.
 *G06T 9/00* (2006.01)
 *G06T 17/20* (2006.01)
 *G06T 15/08* (2011.01)

(52) U.S. Cl.
 CPC .............. *G06T 9/001* (2013.01); *G06T 15/08* (2013.01); *G06T 17/20* (2013.01)

(58) Field of Classification Search
 None
 See application file for complete search history.

(56) References Cited

U.S. PATENT DOCUMENTS

| | | | |
|---|---|---|---|
| 6,438,266 B1* | 8/2002 | Bajaj | G06T 9/001 382/243 |
| 8,805,097 B2 | 8/2014 | Ahn et al. | |
| 2010/0271369 A1* | 10/2010 | Chang | G06T 17/20 345/423 |
| 2012/0013608 A1* | 1/2012 | Ahn | H04N 19/184 345/419 |

(Continued)

OTHER PUBLICATIONS

Li, Jiankun et al., "Progressive Coding of 3D Graphic Models", Proceeding of the IEEE, vol. 86, No. 6, Jun. 1998, pp. 1052-1063.

*Primary Examiner* — Sultana M Zalalee
(74) *Attorney, Agent, or Firm* — Haverstock & Owens, A Law Corporation (57) ABSTRACT

A method of compressing meshes using a projection-based approach, and leveraging the tools and syntax already generated for projection-based point cloud compression is described herein. Similar to the V-PCC approach, the mesh is segmented into surface patches, only the difference is that the segments follow the connectivity of the mesh. Each surface patch (or 3D patch) is then projected to a 2D patch, whereby in the case of the mesh, the triangle surface sampling is similar to a common rasterization approach used in computer graphics. For each patch, the position of the projected vertices is kept in a list, along with the connectivity of those vertices. The sampled surface now resembles a point cloud, and is coded with the same approach used for point cloud compression. Additionally, the list of vertices and connectivity is encoded per patch, and this data is sent along with the coded point cloud data.

27 Claims, 10 Drawing Sheets

(56) References Cited

U.S. PATENT DOCUMENTS

| | | | |
|---|---|---|---|
| 2012/0262444 A1* | 10/2012 | Stefanoski | G06T 9/001 345/419 |
| 2015/0009214 A1* | 1/2015 | Lee | G06T 17/20 345/420 |
| 2015/0035826 A1* | 2/2015 | Tuffreau | G06T 17/20 345/420 |
| 2016/0093088 A1* | 3/2016 | Shreiner | G06T 15/005 345/423 |
| 2017/0221263 A1* | 8/2017 | Wei | G06T 15/04 |
| 2018/0122137 A1* | 5/2018 | Tian | G06K 9/00214 |
| 2018/0189982 A1 | 7/2018 | Laroche et al. | |
| 2018/0350039 A1* | 12/2018 | Michail | G06T 11/40 |
| 2019/0087979 A1* | 3/2019 | Mammou | G06T 9/001 |
| 2019/0088014 A1* | 3/2019 | Richards | G06T 19/00 |
| 2020/0211230 A1* | 7/2020 | Zhao | G06T 15/04 |
| 2020/0294271 A1* | 9/2020 | Ilola | G06T 15/08 |
| 2020/0394453 A1* | 12/2020 | Ma | G06N 7/005 |
| 2021/0099696 A1* | 4/2021 | Sugio | G06T 9/00 |

* cited by examiner

MESH COMPRESSION VIA POINT CLOUD REPRESENTATION

CROSS-REFERENCE TO RELATED APPLICATION(S)

This application claims priority under 35 U.S.C. § 119(e) of the U.S. Provisional Patent Application Ser. No. 62/946,194, filed Dec. 10, 2019 and titled, "MESH COMPRESSION VIA POINT CLOUD REPRESENTATION," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress point clouds based on projection from 3D to 2D is being standardized. The method, also known as V-PCC (video-based point cloud compression), maps the 3D point cloud data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, the current version of the standard is only suitable for the transmission of an unconnected set of points, so there is no mechanism to send the connectivity of points, as it is required in 3D mesh compression.

Methods have been propose to extend the functionality of V-PCC to meshes as well. One possible way is to encode the vertices using V-PCC, and then the connectivity using a mesh compression approach, such as TFAN or Edgebreaker. The limitation of this method is that the original mesh has to be dense, so that the point cloud generated from the vertices is not sparse, and can be efficiently encoded after projection. Moreover, the order of the vertices affect the coding of connectivity, and different methods to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. In the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

A method of compressing meshes using a projection-based approach, and leveraging the tools and syntax already generated for projection-based point cloud compression is described herein. Similar to the V-PCC approach, the mesh is segmented into surface patches, only the difference is that the segments follow the connectivity of the mesh. Each surface patch (or 3D patch) is then projected to a 2D patch, whereby in the case of the mesh, the triangle surface sampling is similar to a common rasterization approach used in computer graphics. For each patch, the position of the projected vertices is kept in a list, along with the connectivity of those vertices. The sampled surface now resembles a point cloud, and is coded with the same approach used for point cloud compression. Additionally, the list of vertices and connectivity is encoded per patch, and this data is sent along with the coded point cloud data.

The additional connectivity data is able to be interpreted as a base mesh that is generated for each patch, giving the decoder the flexibility to use this additional data or not. This data could be used to improve rendering and in point filtering algorithms. Moreover, the mesh is encoded with the same principle of projection-based compression, which leads to a better integration with the current V-PCC approach of projection-based coding of point clouds.

In one aspect, a method programmed in a non-transitory memory of a device comprises performing mesh voxelization on an input mesh, implementing patch generation which segments the mesh into patches including a rasterized mesh surface and vertices location and connectivity information, generating a video-based point cloud compression (V-PCC) image from the rasterized mesh surface, implementing base-mesh coding with the vertices location and connectivity information and generating a V-PCC bitstream based on the V-PCC image and the base-mesh coding. Mesh voxelization includes shifting and/or scaling mesh values to avoid negative values and non-integer values. Mesh voxelization includes finding a lowest vertex value below zero and shifting the mesh values so the lowest vertex value is above zero. Implementing patch generation includes calculating a normal per triangle. Calculating the normal of the triangle includes using a cross-product between edges. The method further comprises categorizing triangles according to the normals. The method further comprises implementing a refinement process by analyzing neighboring triangles. Base-mesh coding includes encoding (u,v) coordinates of vertices. Generating the V-PCC bitstream includes base-mesh signaling and utilizes a multi-layer implementation. A first layer in the multi-layer implementation includes a raw point cloud, a second layer in the multi-layer implementation includes a sparse mesh, and a third layer in the multi-layer implementation includes a dense mesh. The method further comprises generating a base mesh including additional connectivity data for each patch, wherein a decoder determines whether to utilize the additional connectivity data, further wherein the additional connectivity data improves rendering and point filtering. The connectivity information is encoded based on color codes. Generating the V-PCC bitstream based on the V-PCC image and the base-mesh coding utilizes the connectivity information per patch.

In another aspect, an apparatus comprises a non-transitory memory for storing an application, the application for: performing mesh voxelization on an input mesh, implementing patch generation which segments the mesh into patches including a rasterized mesh surface and vertices location and connectivity information, generating a video-based point cloud compression (V-PCC) image from the rasterized mesh surface, implementing base-mesh coding with the vertices location and connectivity information and generating a V-PCC bitstream based on the V-PCC image and the base-mesh coding and a processor coupled to the memory, the processor configured for processing the application. Mesh voxelization includes shifting and/or scaling mesh values to avoid negative values and non-integer values. Mesh voxelization includes finding a lowest vertex value below zero and shifting the mesh values so the lowest vertex value is above zero. Implementing patch generation includes calculating a normal per triangle. Calculating the normal of the triangle includes using a cross-product between edges. The application is further for categorizing triangles according to the normals. The application is further for implementing a refinement process by analyzing neighboring triangles. Base-mesh coding includes encoding (u,v) coordinates of vertices. Generating the V-PCC bitstream includes base-mesh signaling and utilizes a multi-layer implementation. A first layer in the multi-layer implementation includes a raw point cloud, a second layer in the multi-layer implementation includes a sparse mesh, and a third layer in the multi-layer implementation includes a dense mesh. The application is further for generating a base mesh including additional connectivity data for each patch, wherein a decoder determines whether to utilize the additional connectivity data, further wherein the additional connectivity data improves rendering and point filtering. The connectivity information is encoded based on color codes. Generating the V-PCC bitstream based on the V-PCC image and the base-mesh coding utilizes the connectivity information per patch.

In another aspect, a system comprises one or more cameras for acquiring three dimensional content and an encoder for encoding the three dimensional content by: performing mesh voxelization on an input mesh of the three dimensional content, implementing patch generation which segments the mesh into patches including a rasterized mesh surface and vertices location and connectivity information, generating a video-based point cloud compression (V-PCC) image from the rasterized mesh surface, implementing base-mesh coding with the vertices location and connectivity information and generating a V-PCC bitstream based on the V-PCC image and the base-mesh coding. Mesh voxelization includes shifting and/or scaling mesh values to avoid negative values and non-integer values. Mesh voxelization includes finding a lowest vertex value below zero and shifting the mesh values so the lowest vertex value is above zero. Implementing patch generation includes calculating a normal per triangle. Calculating the normal of the triangle includes using a cross-product between edges. The encoder is further for categorizing triangles according to the normals. The encoder is further for implementing a refinement process by analyzing neighboring triangles. Base-mesh coding includes encoding (u,v) coordinates of vertices. Generating the V-PCC bitstream includes base-mesh signaling and utilizes a multi-layer implementation. A first layer in the multi-layer implementation includes a raw point cloud, a second layer in the multi-layer implementation includes a sparse mesh, and a third layer in the multi-layer implementation includes a dense mesh. The encoder is further configured for generating a base mesh including additional connectivity data for each patch, wherein a decoder determines whether to utilize the additional connectivity data, further wherein the additional connectivity data improves rendering and point filtering. The connectivity information is encoded based on color codes. Generating the V-PCC bitstream based on the V-PCC image and the base-mesh coding utilizes the connectivity information per patch.

DETAILED DESCRIPTION OF THE PREFERRED EMBODIMENT

Methods for compression of 3D mesh data using a point cloud representation of the mesh surface are described above. Embodiments utilize 3D surface patches to represent point clouds and perform temporarily consistent global mapping of 3D patch surface data into 2D canvas images.

In 3D point cloud coding using video encoders, projection from 3D to 2D is important to generate the videos that will represent the point cloud. The most efficient way of generating those videos is using 3D patches, which segments the surface of the object and uses orthogonal projection to generate segmented depth images that are bundled together and used as input of video encoders. In the current point cloud standard, 3D meshes cannot be encoded, since there is no defined method to encode the connectivity of the mesh. Furthermore, the standard performs poorly if vertex data is sparse, since it cannot exploit the correlation between the vertices.

Methods to perform coding of meshes using the video-based standard for point cloud compression are described herein. Segmenting the mesh surfaces and joint surface sampling and 2D patch generation methods are disclosed. Also, the disclosed methods describe each patch being encoded for the local connectivity, and the position of the vertices are projected to the 2D patches. Methods for signaling the connectivity and vertices position, and enabling the reconstruction of the original input mesh are also described.

Embodiments may be applied to dense time-varying meshes, with mesh attributes such as texture.

Figure 1:
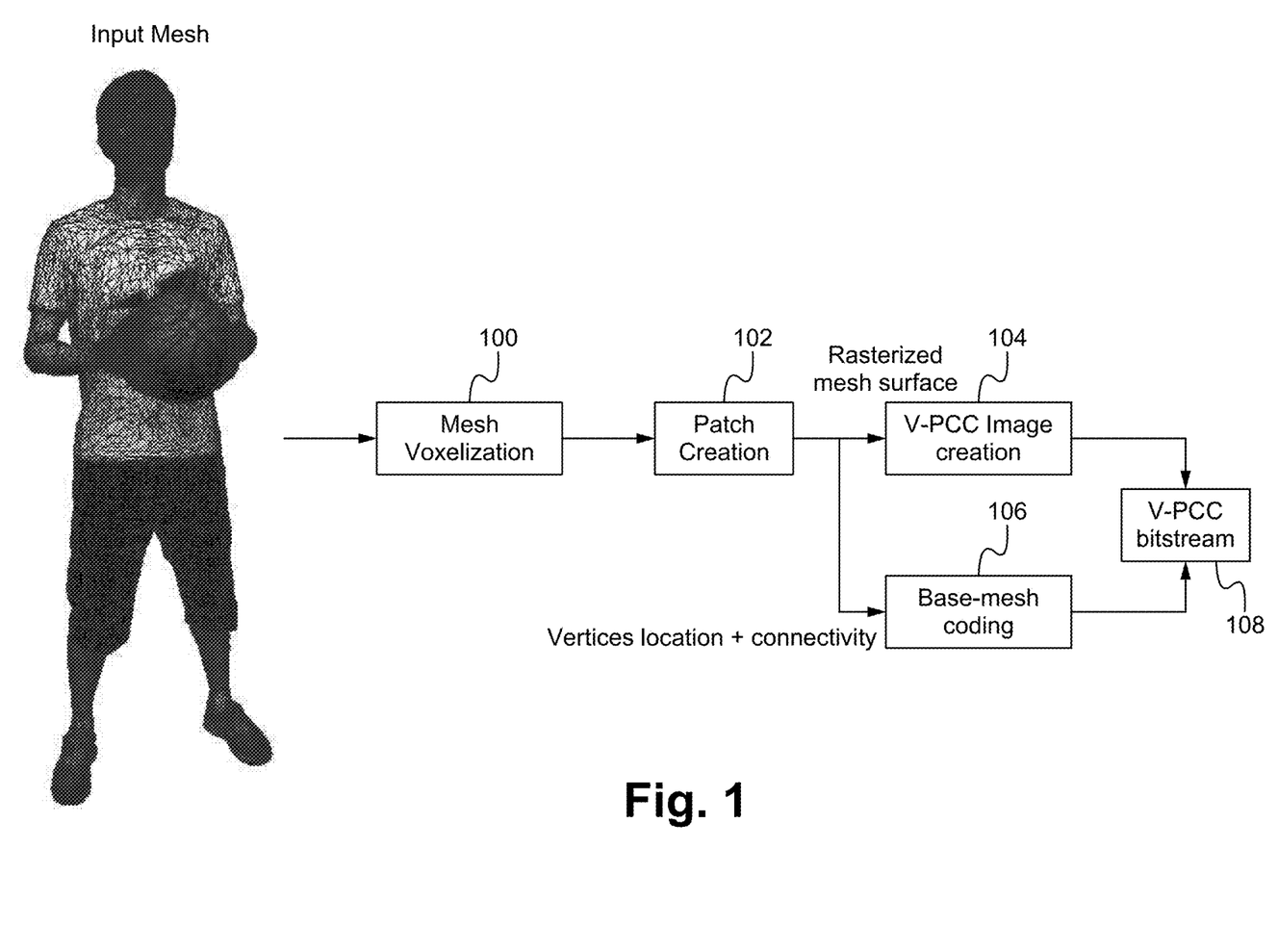
FIG. 1 illustrates a mesh compression method according to some embodiments.

FIG. 1 illustrates a mesh compression method according to some embodiments. In the step 100, mesh voxelization is performed on an input mesh. Mesh voxelization involves converting floating point values of the positions of points of the input mesh to integers. The precision of the integers is able to be set by a user or automatically. In some embodiments, mesh voxelization includes shifting values so there are no negative numbers. In the step 102, patch creation/generation is implemented which segments the mesh into patches. Patch generation also generates 1) a rasterized mesh surface and 2) vertices location and connectivity information. The rasterized mesh surface is a set of points which go through the V-PCC image generation and is encoded as a V-PCC image, in the step 104. The vertices location and connectivity information is received for base-mesh coding, in the step 106. In the step 108, the V-PCC bitstream is generated based on the V-PCC image generation and the base-mesh coding. In some embodiments, fewer or additional steps are implemented. In some embodiments, the order of the steps is modified.

Mesh Voxelization

Figure 2:
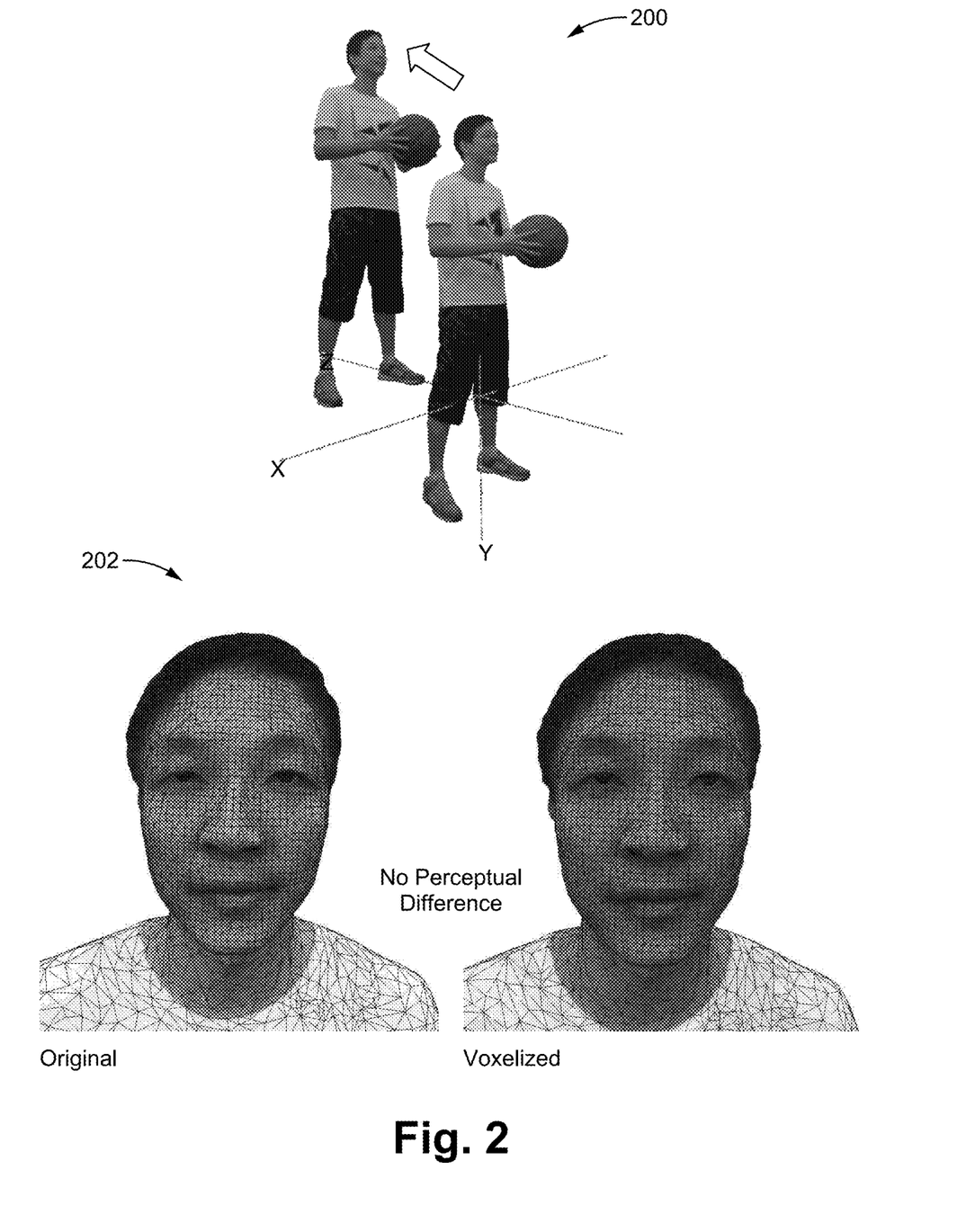
FIG. 2 illustrates mesh voxelization according to some embodiments.

FIG. 2 illustrates mesh voxelization according to some embodiments. As is shown in image 200, the original mesh is below the axis line, resulting in negative numbers. Via mesh voxelization, the mesh is shifted and/or scaled to avoid negative values and non-integer values. In one implementation, the lowest vertex value below zero is found, and then the values are able to be shifted such that the lowest vertex value is above zero. In some embodiments, the range of values is fit into a specified bitrange (e.g., by scaling) such as 11 bits.

Image 202 shows that there is no perceptual difference between the original mesh and the voxelized mesh.

Patch Generation

Figure 3:
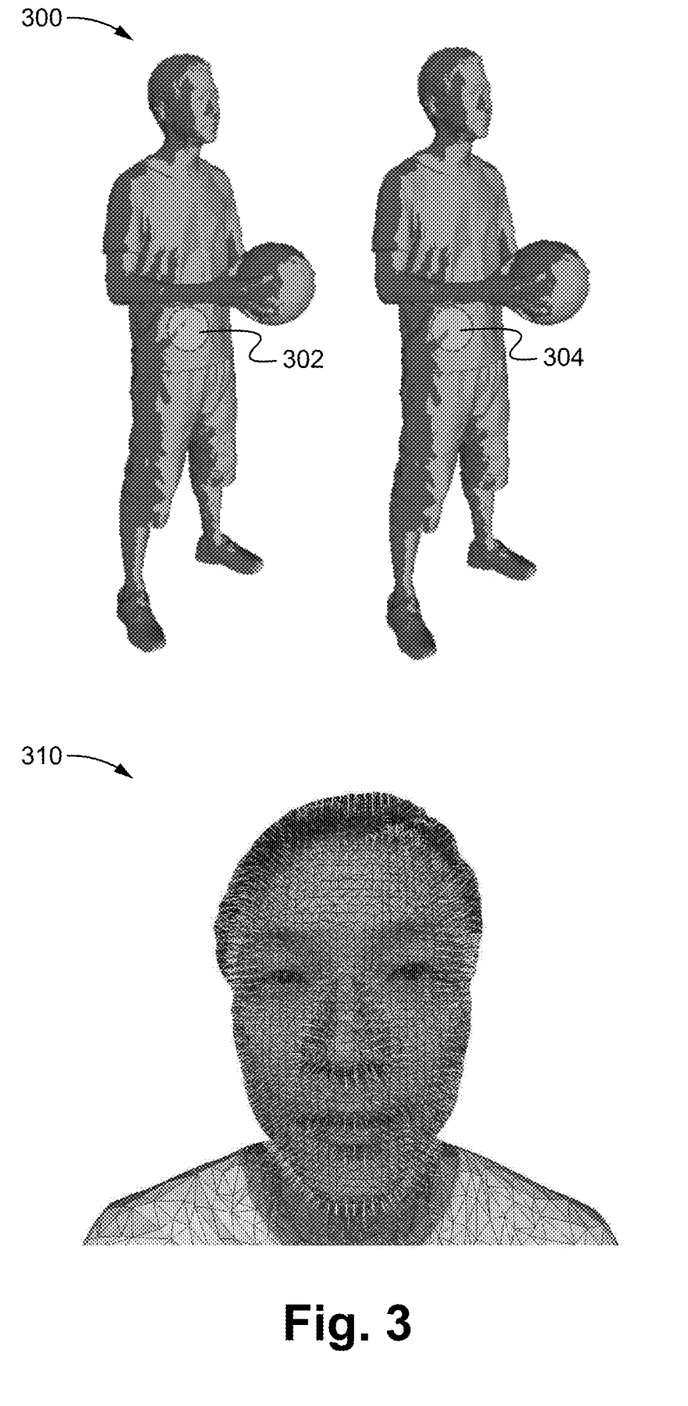
FIG. 3 illustrates images related to patch generation according to some embodiments.

Patch generation described herein is similar to patch generation in V-PCC. However, instead of calculating the normal per point, the normal per triangle is calculated. The normal per triangle is calculated using the cross-product between the edges to determine a normal vector. Then, the triangles are categorized according to the normals. For example, the normals are divided into n (e.g., 6) categories such as front, back, top, down, left and right. The normals are indicated in different colors to show the initial segmentation. Image 300 of FIG. 3 shows the different colors in grayscale such as the black and light gray as different colors indicating different normals. Although it may be difficult to see in image 300, top surfaces (e.g., the top of the person's head, the top of the ball and the top of the sneakers) are one color (e.g., green), a first side of the person/ball is very dark, representing another color (e.g., red), the bottom of the ball is another color (e.g., purple), and the front of the person and ball, which is mostly light gray, represents another color (e.g., cyan).

By multiplying the product of the normal by the directions, the main direction is able to be found. By looking at neighboring triangles, a smoothing/refinement process is able to be implemented. For example, if the number of neighboring triangles above a threshold are all blue, then this triangle also be classified as blue, even if there was an anomaly which initially indicated the triangle was red. For example, the red triangle as indicated by reference 302 is able to be corrected to cyan as shown in reference 304.

Image 310 shows an example of triangles with normal vectors.

Connected components of triangles are generated to identify which of the triangles have the same color (e.g., triangles with the same category sharing at least one vertex).

Connectivity information describes how the points are connected in 3D. These connections together generate triangles (to be more specific, 3 distinct connections that share 3 points), which consequently generate surfaces (described by a collection of triangles). Although triangles are described herein, other geometric shapes are also allowed (e.g., rectangles).

Colors are able to be used to encode the connectivity by identifying the triangles with different colors. Each triangle, identified by three connections, is coded with a unique color.

By projecting the mesh on a 2D surface, the area covered by the projection of a triangle is also determined by the collection of pixels. If the grouped pixels are coded with different colors, the triangles can be identified by the different colors in the image. Once the triangles are known, the connectivity can be obtained by just identifying the three connections that form the triangle.

Each triangle is projected to the patch. If the projected position of a vertex is already occupied, the triangle is coded in another patch, so it goes to a missing triangles list to be processed again later. Alternatively, maps are able to be used to identify the vertices that overlap and still be able to represent the triangle with overlapped vertices. In another alternative, points are able to be segregated into separate layers (e.g., one set of points in one layer and a second set of points in a second layer).

The triangle is rasterized to generate the points for the point cloud representation.

Figure 4:
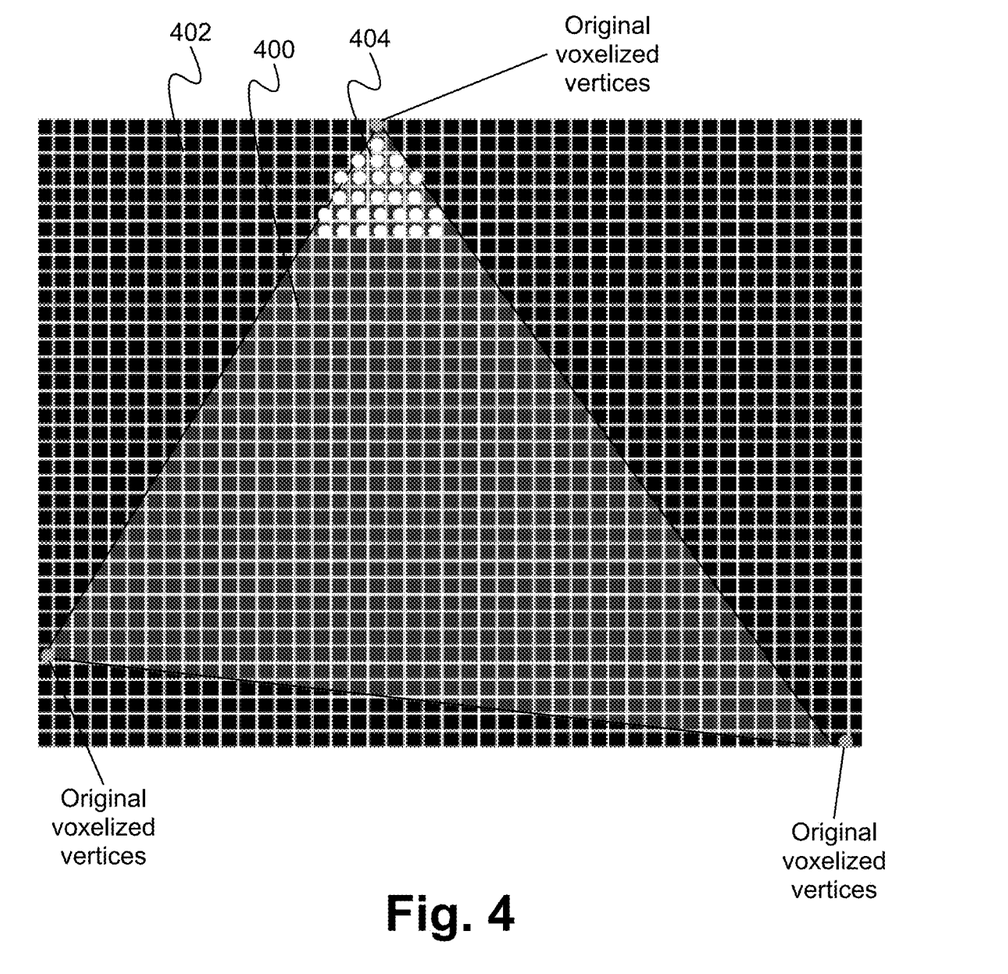
FIG. 4 illustrates a diagram of a projected triangle for point cloud representation according to some embodiments.

FIG. 4 illustrates a diagram of a projected triangle for point cloud representation according to some embodiments. The triangle 400 has been projected to a grid 402 (e.g., a 2D projection of the triangle). Each square in the grid 402 is a point in the point cloud. There are points that are the original points of the vertices. When the points are projected they are voxelized and projected into these positions as shown. The points 404 in the 2D projection mark the vertices on the original mesh. For the area of the triangle 400, points are generated by rasterizing the surface. The grid elements within the triangle become points in the point cloud, which generates a point cloud from the mesh (e.g., the rasterization is performed on the projection plane).

The points added to the point cloud are following the structure of the mesh, so the point cloud geometry is able to be as coarse as the underlying mesh. However, the geometry is able to be improved by sending additional positions for each rasterized pixel.

Base-Mesh Coding

Figure 5:
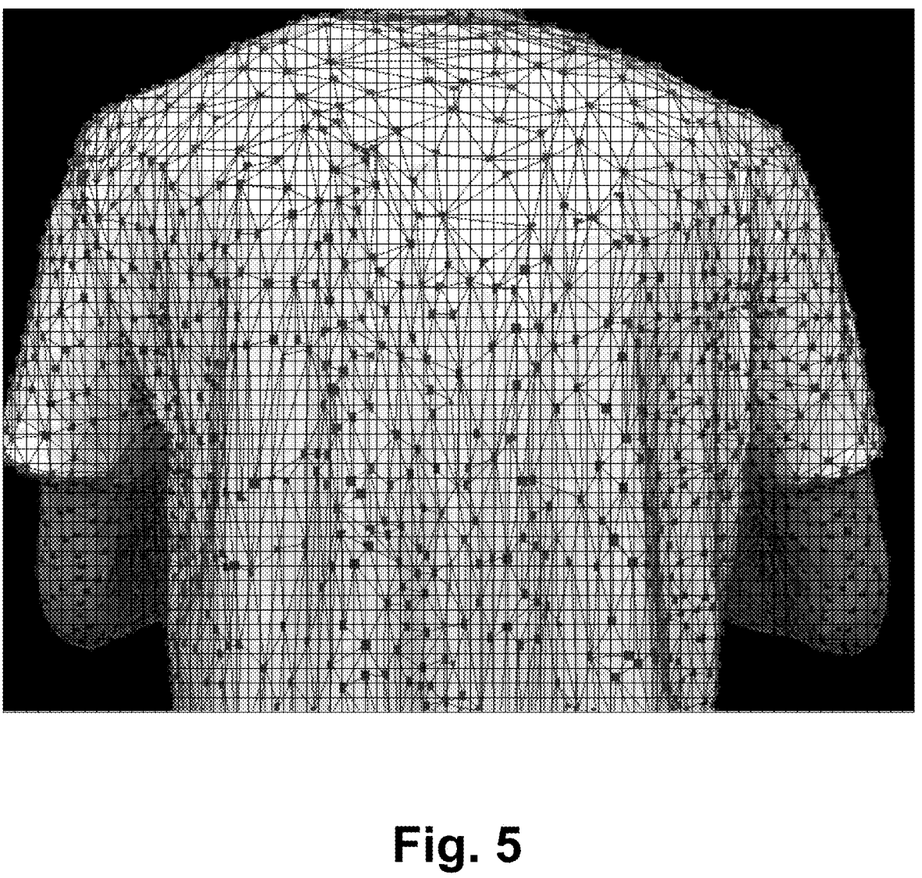
FIG. 5 shows an exemplary image of vertices and triangles according to some embodiments.

A list of points in a patch are the vertices of the triangles, and connectivity of the mesh is the same even after projection. FIG. 5 shows an exemplary image of vertices and triangles according to some embodiments. The vertices are the black points, and the connectivity is the lines connecting the black points.

Connectivity is encoded (e.g., based on color codes). In some embodiments, a list of integer values is encoded. Differential Pulse Code Modulation (DPCM) in the list is able to be used. In some embodiments, the list is able to be refined or smart mesh-coding is able to be implemented. In some embodiments, more sophisticated approaches are also possible (e.g., using Edgebreaker or TFAN, both of which are coding algorithms).

In some embodiments, the (u,v) coordinates of the vertices are encoded, not (x, y, z). The (u,v) coordinates are the positions on the 2D grid (e.g., where the vertex was projected to). From the projection in the geometry images, the (x, y, z) information is able to be determined. A DPCM approach is also possible. In some embodiments, the (u,v) coordinates are stored in a list. The order is able to be determined by the connectivity. Based on the connectivity, it is known that certain vertices are connected, so the value of the (u, v) of the connected vertices should be similar, which also enables predictions such as a parallelogram prediction (e.g., Draco, a mesh compression algorithm).

Figure 6:
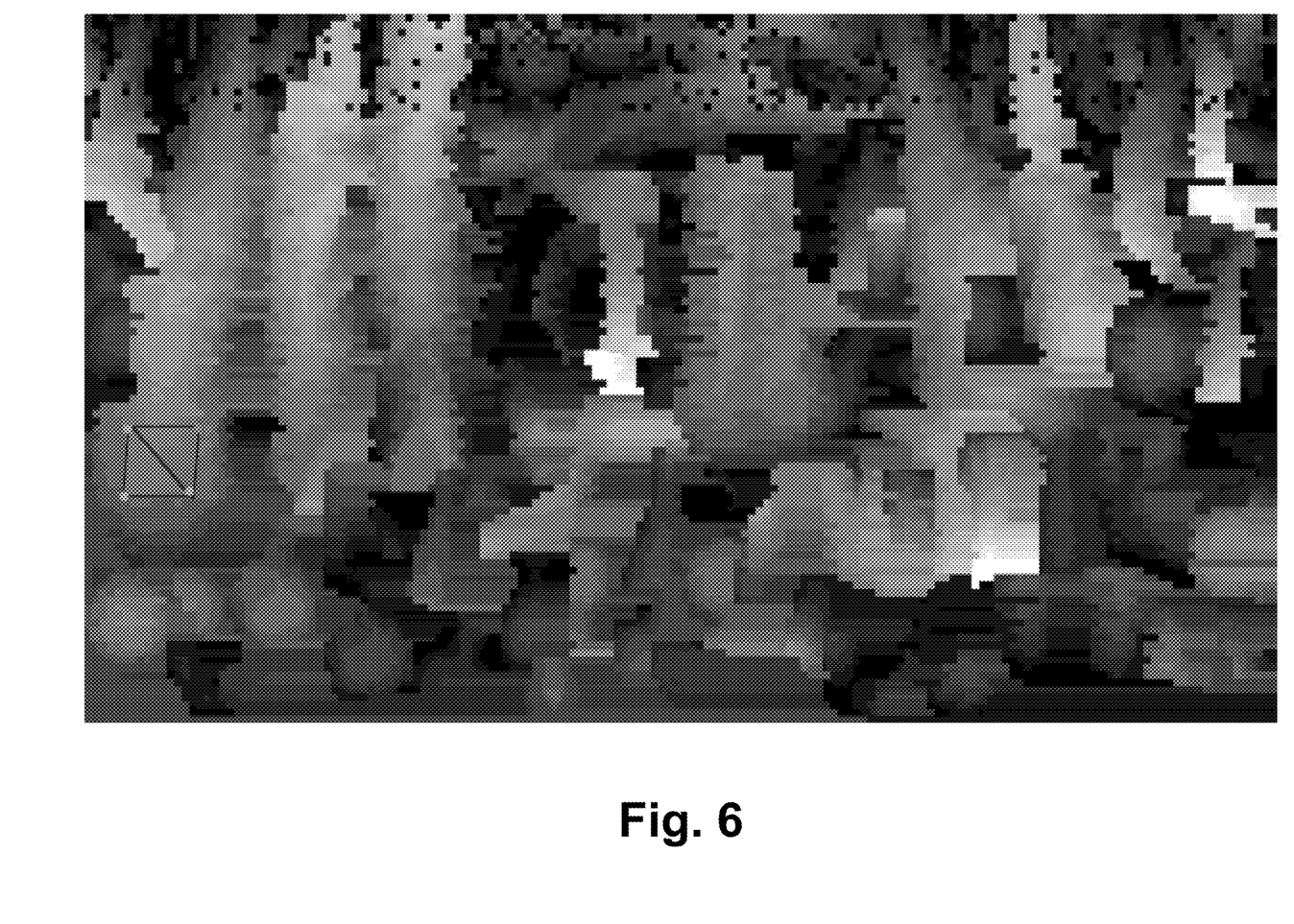
FIG. 6 illustrates an example of encoding connectivity by using the color channel of the geometry image to indicate the triangle connectivity according to some embodiments.

FIG. 6 illustrates an example of encoding connectivity by using the color channel of the geometry image to indicate the triangle connectivity according to some embodiments. For example, if certain triangles are the same, they are the color yellow, and a different triangle may be the color blue, and so on such that the colors identify the triangles and the connectivity of the mesh.

Base-Mesh Signaling

Extra information is sent per patch. Inside each patch information, a list of connected components (e.g., vertices) and the location of the vertices in 2D space is sent. A more efficient notation could use DPCM schemes for the face and vertices, as discussed herein.

Figure 7:
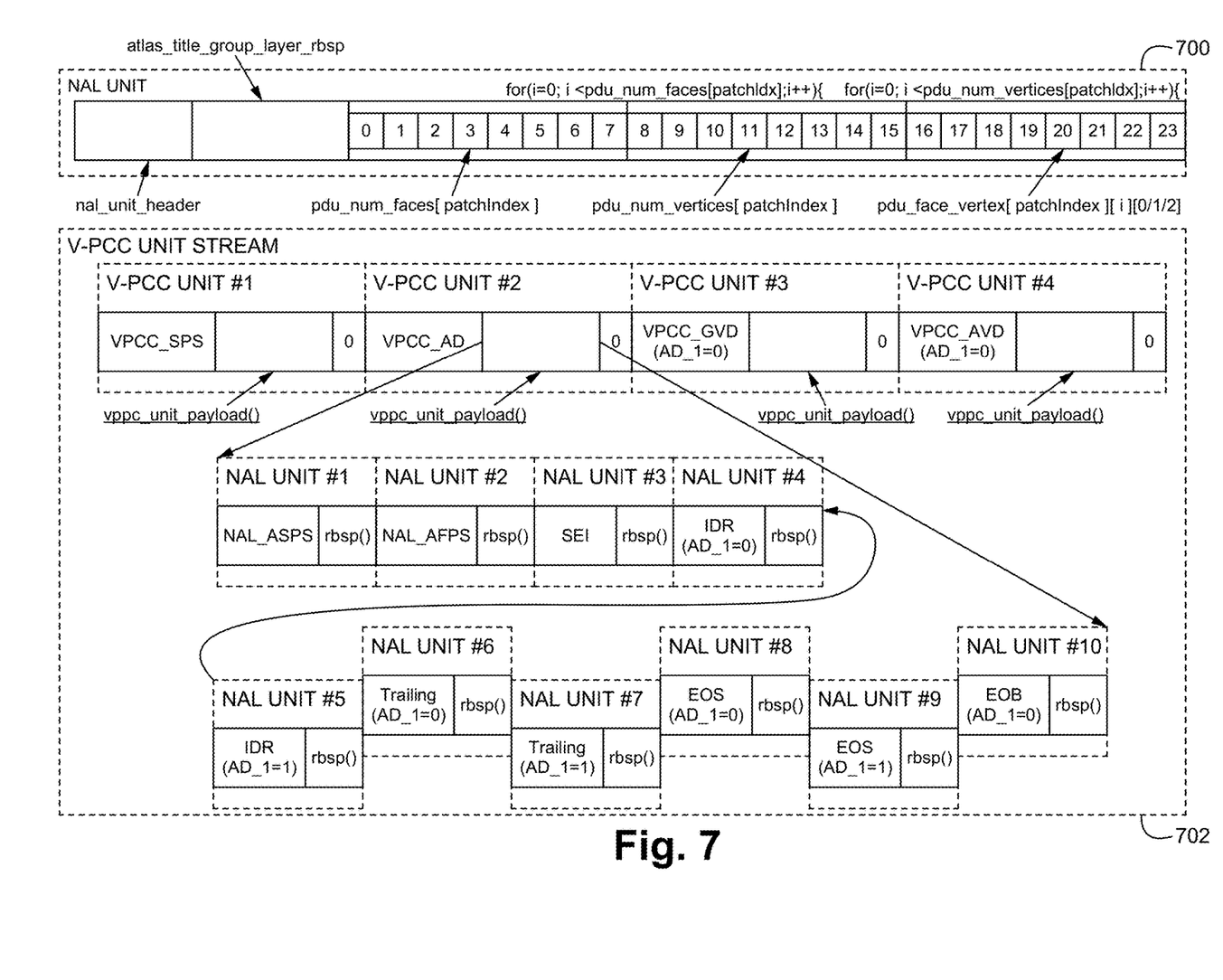
FIG. 7 illustrates a Network Abstraction Layer (NAL) unit and multi-layer implementation for base-mesh signaling according to some embodiments.

FIG. 7 illustrates a Network Abstraction Layer (NAL) unit and multi-layer implementation for base-mesh signaling according to some embodiments. The NAL 700 includes information such as a header, group layer, number of faces, number of vertices, number of faces, and vertex positions.

In some embodiments, a multi-layer implementation in NAL is used to send an additional layer that contains the connectivity information. The V-PCC unit stream 702 utilized in the multi-layer implementation is shown. The first layer (e.g., layer 0) defines the point cloud, and layer 1 defines the mesh layer. In some embodiments, the layers are related to each other. In some embodiments, additional layers are utilized.

Figure 8:
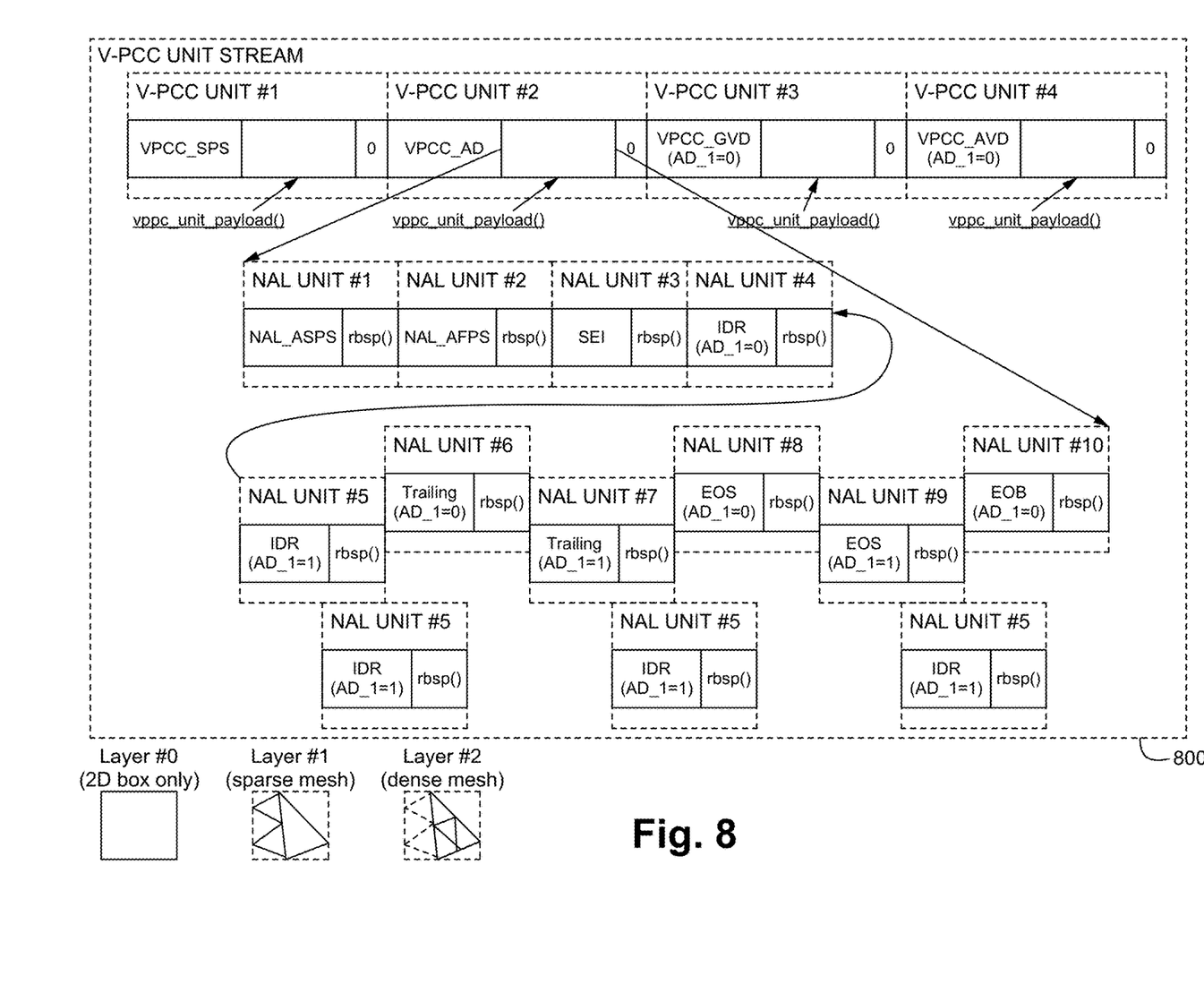
FIG. 8 illustrates a multi-layer implementation for base-mesh signaling according to some embodiments.

FIG. 8 illustrates a multi-layer implementation for base-mesh signaling according to some embodiments. In a hierarchical representation, a layer_id could be used to send meshes with different resolutions. For example, layer 0 is the raw point cloud, layer 1 is the sparse mesh, and layer 2 is the dense mesh. Additional layers are able to be implemented (e.g., layer 3 is the very dense mesh). In some embodiments, the order of the layers is different, for example, layer 0 is the dense mesh, layer 1 is the sparse mesh, and layer 2 is the raw point cloud. In some embodiments, the additional layer only provides the difference or delta from the previous layer. For example, as shown in FIG. 8, in the layer 1 has 3 triangles, and layer 2 has 6 triangles where the large triangle is divided into 4 triangles, and the division of the large triangle (e.g., the 4 triangles) is included in layer 2.

The patch data unit syntax is able to be modified to include:

| | Descriptor |
|---|---|
| patch_data_unit (patchIdx) { | |
|   pdu_2d_pos_x [patchIdx] | u(v) |
|   pdu_2d_pos_y [patchIdx] | u(v) |
|   pdu_2d_delta_size_x [patchIdx] | se(v) |
|   pdu_2d_delta_size_y [patchIdx] | se(v) |
|   pdu_3d_pos_x [patchIdx] | u(v) |
|   pdu_3d_pos_y [patchIdx] | u(v) |
|   pdu_3d_pos_min_z [patchIdx] | u(v) |
|   if (asps_normal_axis_max_delta_value_ | |

-continued

| | Descriptor |
|---|---|
|   enabled_flag) | |
|     pdu_3d_pos_delta_max_z [patchIdx] | u(v) |
|   pdu_projection_id [patchIdx] | u(v) |
|   pdu_orientation_index [patchIdx] | u(v) |
|   if (afps_lod_bit_count > 0) | |
|     pdu_lod [patchIdx] | u(v) |
| if (asps_point_local_reconstruction_enabled_flag) | |
|     point_local_reconstruction_data (patchIdx) | |
| pdu_num_faces [patchIdx] | ue(v) |
| pdu_num_vertices [patchIdx] | ue(v) |
| for (i = 0; i < pdu_num_faces [patchIdx]; i++) { | |
|   pdu_face_vertex[patchIdx][i][0] | u(v) |
|   pdu_face_vertex[patchIdx][i][1] | u(v) |
|   pdu_face_vertex[patchIdx][i][2] | u(v) |
| } | |
| for (i = 0; i < pdu_num_vertices [patchIdx]; i++) { | |
|   pdu_vertex_pos[patchIdx][i][0] | u(v) |
|   pdu_vertex_pos[patchIdx][i][1] | u(v) |
| } | |
| } | |

In some embodiments, alternative coding is implemented such as using TFAN or Edgebreaker to encode patch connectivity, using parallelogram prediction for vertices, and/or using DPCM encoding.

Figure 9:
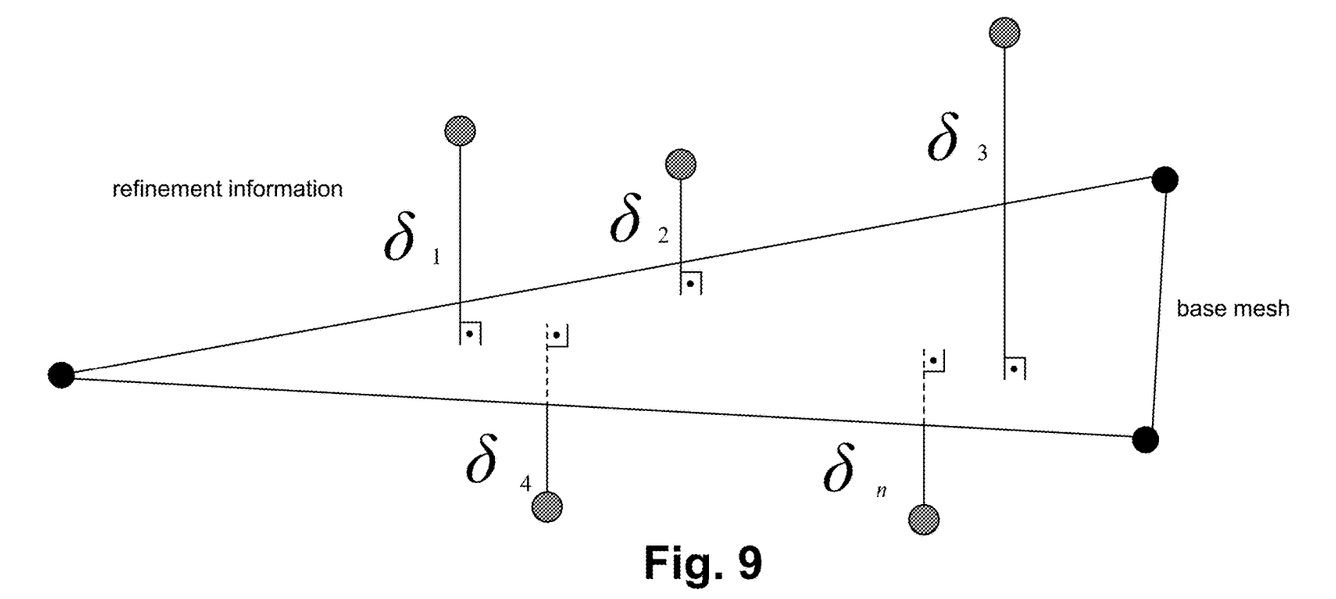
FIG. 9 illustrates a diagram of geometry refinement according to some embodiments.

FIG. 9 illustrates a diagram of geometry refinement according to some embodiments. A more accurate position of the points can be improved by transmitting delta information from the base mesh surface to the point cloud real location. Since when the mesh surface was rasterized, the point cloud generated will have a geometry similar to the mesh surface, which can be coarse. Delta information is able to be obtained by sending the delta from the mesh surface, and the normal direction of the mesh could be considered as well.

As described herein, since the triangle is considered to be flat, more information per triangle is able to be sent.

Rendering optimization and geometry filtering are also able to be implemented. Since the base mesh indicates a surface, all the points contained in the boundary of the triangle are logically connected. When reprojecting the points, holes could appear due to geometry differences and different baseline distances. However, the renderer could use the underlying mesh information to improve the reprojection. Since it knows from the mesh that the points should be connected logically in a surface, the renderer could generate interpolated points and close the holes, even without sending any extra information.

For example, there are instances where there is a hole in a point cloud due to projection, but since it is known that the surface was represented by a triangle, all of the points should be filled on that surface, so even if the points are not coded explicitly from the mesh representation, the missing points are able to be filled in using geometry filtering.

As described herein, the mesh compression method uses a projection-based approach, and leveraging the tools and syntax already generated for projection-based point cloud compression is described herein. Similar to the V-PCC approach, the mesh is segmented into surface patches, only the difference is that the segments follow the connectivity of the mesh. Each surface patch (or 3D patch) is then projected to a 2D patch, whereby in the case of the mesh, the triangle surface sampling is similar to a common rasterization approach used in computer graphics. For each patch, the position of the projected vertices is kept in a list, along with the connectivity of those vertices. The sampled surface now resembles a point cloud, and is coded with the same approach used for point cloud compression. Additionally, the list of vertices and connectivity is encoded per patch, and this data is sent along with the coded point cloud data.

The additional connectivity data is able to be interpreted as a base mesh that is generated for each patch, giving the decoder the flexibility to use this additional data or not. This data could be used to improve rendering and in point filtering algorithms. Moreover, the mesh is encoded with the same principle of projection-based compression, which leads to a better integration with the current V-PCC approach of projection-based coding of point clouds.

Figure 10:
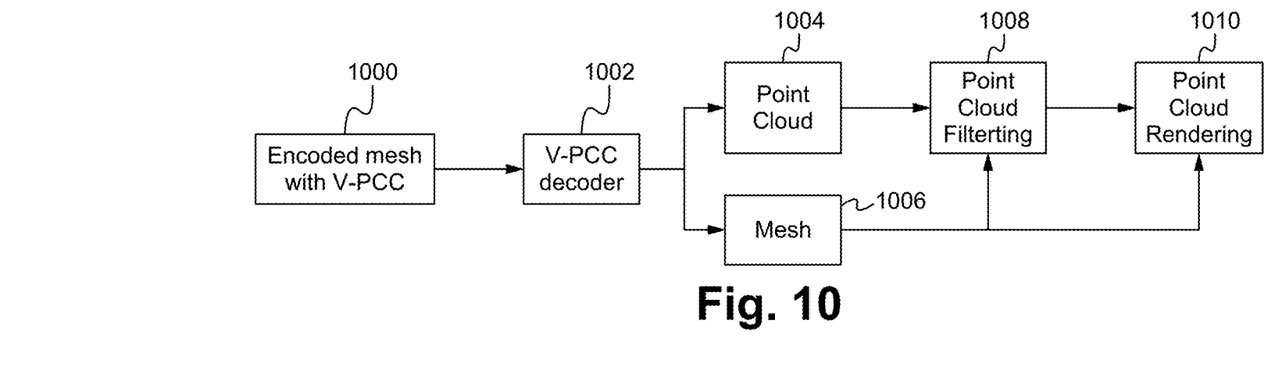
FIG. 10 illustrates a flow chart of point cloud rendering using the mesh compression method according to some embodiments.

FIG. 10 illustrates a flow chart of point cloud rendering using the mesh compression method according to some embodiments. In the step 1000, a mesh is encoded with V-PCC and/or the encoded mesh is received (e.g., at a device). In the step 1002, the encoded mesh goes to the V-PCC decoder for decoding which results in a point cloud 1004 and a mesh 1006. In the step 1008, point cloud filtering is applied to the point cloud 1004 and mesh 1006. The filtered point cloud and the mesh 1006 are used in point cloud rendering, in the step 1010. In some embodiments, fewer or additional steps are implemented. In some embodiments, the order of the steps is modified.

Figure 11:
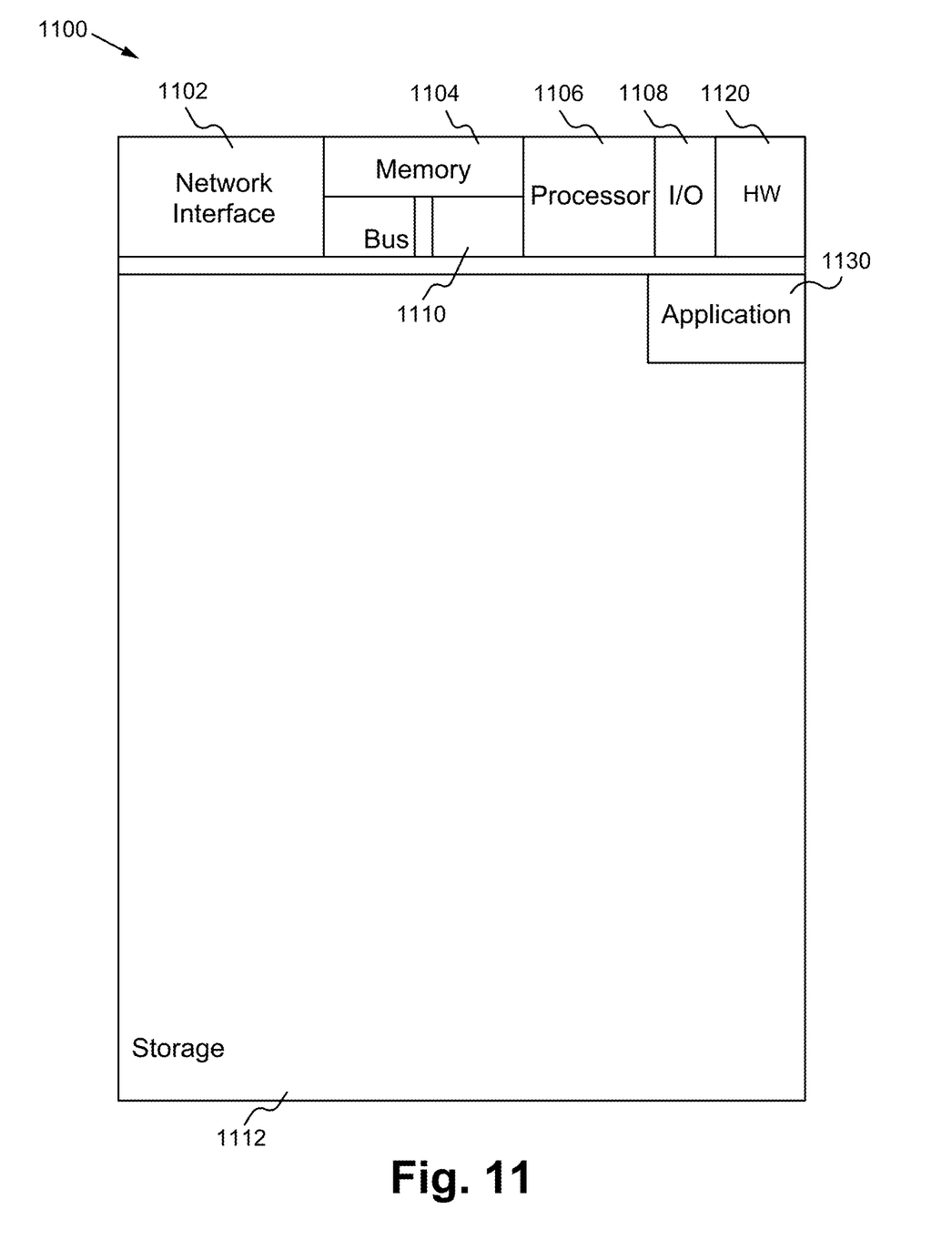
FIG. 11 illustrates a block diagram of an exemplary computing device configured to implement the mesh compression method according to some embodiments.

FIG. 11 illustrates a block diagram of an exemplary computing device configured to implement the mesh compression method according to some embodiments. The computing device 1100 is able to be used to acquire, store, compute, process, communicate and/or display information such as images and videos including 3D content. The computing device 1100 is able to implement any of the mesh compression aspects. In general, a hardware structure suitable for implementing the computing device 1100 includes a network interface 1102, a memory 1104, a processor 1106, I/O device(s) 1108, a bus 1110 and a storage device 1112. The choice of processor is not critical as long as a suitable processor with sufficient speed is chosen. The memory 1104 is able to be any conventional computer memory known in the art. The storage device 1112 is able to include a hard drive, CDROM, CDRW, DVD, DVDRW, High Definition disc/drive, ultra-HD drive, flash memory card or any other storage device. The computing device 1100 is able to include one or more network interfaces 1102. An example of a network interface includes a network card connected to an Ethernet or other type of LAN. The I/O device(s) 1108 are able to include one or more of the following: keyboard, mouse, monitor, screen, printer, modem, touchscreen, button interface and other devices. Mesh compression application(s) 1130 used to implement the mesh compression method are likely to be stored in the storage device 1112 and memory 1104 and processed as applications are typically processed. More or fewer components shown in FIG. 11 are able to be included in the computing device 1100. In some embodiments, mesh compression hardware 1120 is included. Although the computing device 1100 in FIG. 11 includes applications 1130 and hardware 1120 for the mesh compression method, the mesh compression method is able to be implemented on a computing device in hardware, firmware, software or any combination thereof. For example, in some embodiments, the mesh compression applications 1130 are programmed in a memory and executed using a processor. In another example, in some embodiments, the mesh compression hardware 1120 is programmed hardware logic including gates specifically designed to implement the mesh compression method.

In some embodiments, the mesh compression application(s) 1130 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the mesh compression method, a device acquires or receives 3D content and processes and/or sends the content in an optimized manner to enable proper, efficient display of the 3D content. The mesh compression method is able to be implemented with user assistance or automatically without user involvement.

In operation, the mesh compression method enables more efficient and more accurate mesh compression compared to previous implementations.

In an exemplary implementation, the mesh compression described herein was implemented on top of TMC2v8.0 with one frame only and a single map. Information from the implementation includes:
Bitstream Stat:
Header: 16B 128b
vpccUnitSize[VPCC_VPS]: 31 B 248 b
vpccUnitSize[VPCC_AD]: 451967 B 3615736 b
vpccUnitSize[VPCC_OVD]: 25655 B 205240 b (Ocm video=25647 B)
vpccUnitSize[VPCC_GVD]: 64342 B 514736 b (Geo video=64334 B+0 B+0 B+0B)
vpccUnitSize[VPCC_AVD]: 72816 B 582528 b (Tex video=72808 B+0 B)
TotalMetadata: 477685 B 3821480 b
TotalGeometry: 64334 B 514672 b
TotalTexture: 72808 B 582464 b
Total: 614827 B 4918616 b
Total bitstream size 614843 B Some Embodiments of Mesh Compression Via Point Cloud Representation 1. A method programmed in a non-transitory memory of a device comprising:
    performing mesh voxelization on an input mesh;
    implementing patch generation which segments the mesh into patches including a rasterized mesh surface and vertices location and connectivity information;
    generating a video-based point cloud compression (V-PCC) image from the rasterized mesh surface;
    implementing base-mesh coding with the vertices location and connectivity information; and
    generating a V-PCC bitstream based on the V-PCC image and the base-mesh coding.
2. The method of clause 1 wherein mesh voxelization includes shifting and/or scaling mesh values to avoid negative values and non-integer values.
3. The method of clause 2 wherein mesh voxelization includes finding a lowest vertex value below zero and shifting the mesh values so the lowest vertex value is above zero.

4. The method of clause 1 wherein implementing patch generation includes calculating a normal per triangle.
5. The method of clause 4 wherein calculating the normal of the triangle includes using a cross-product between edges.
6. The method of clause 4 further comprising categorizing triangles according to the normals.
7. The method of clause 4 further comprising implementing a refinement process by analyzing neighboring triangles.
8. The method of clause 1 wherein base-mesh coding includes encoding (u,v) coordinates of vertices.
9. The method of clause 1 wherein generating the V-PCC bitstream includes base-mesh signaling and utilizes a multi-layer implementation.
10. The method of clause 9 wherein a first layer in the multi-layer implementation includes a raw point cloud, a second layer in the multi-layer implementation includes a sparse mesh, and a third layer in the multi-layer implementation includes a dense mesh.
11. The method of clause 1 further comprising generating a base mesh including additional connectivity data for each patch, wherein a decoder determines whether to utilize the additional connectivity data, further wherein the additional connectivity data improves rendering and point filtering.
12. The method of clause 1 wherein the connectivity information is encoded based on color codes.
13. The method of clause 1 wherein generating the V-PCC bitstream based on the V-PCC image and the base-mesh coding utilizes the connectivity information per patch.
14. An apparatus comprising:
a non-transitory memory for storing an application, the application for:
performing mesh voxelization on an input mesh;
implementing patch generation which segments the mesh into patches including a rasterized mesh surface and vertices location and connectivity information;
generating a video-based point cloud compression (V-PCC) image from the rasterized mesh surface;
implementing base-mesh coding with the vertices location and connectivity information; and
generating a V-PCC bitstream based on the V-PCC image and the base-mesh coding; and
a processor coupled to the memory, the processor configured for processing the application.
15. The apparatus of clause 14 wherein mesh voxelization includes shifting and/or scaling mesh values to avoid negative values and non-integer values.
16. The apparatus of clause 15 wherein mesh voxelization includes finding a lowest vertex value below zero and shifting the mesh values so the lowest vertex value is above zero.
17. The apparatus of clause 14 wherein implementing patch generation includes calculating a normal per triangle.
18. The apparatus of clause 17 wherein calculating the normal of the triangle includes using a cross-product between edges.
19. The apparatus of clause 17 wherein the application is further for categorizing triangles according to the normals.
20. The apparatus of clause 17 wherein the application is further for implementing a refinement process by analyzing neighboring triangles.
21. The apparatus of clause 14 wherein base-mesh coding includes encoding (u,v) coordinates of vertices.
22. The apparatus of clause 14 wherein generating the V-PCC bitstream includes base-mesh signaling and utilizes a multi-layer implementation.
23. The apparatus of clause 22 wherein a first layer in the multi-layer implementation includes a raw point cloud, a second layer in the multi-layer implementation includes a sparse mesh, and a third layer in the multi-layer implementation includes a dense mesh.
24. The apparatus of clause 14 wherein the application is further for generating a base mesh including additional connectivity data for each patch, wherein a decoder determines whether to utilize the additional connectivity data, further wherein the additional connectivity data improves rendering and point filtering.
25. The apparatus of clause 14 wherein the connectivity information is encoded based on color codes.
26. The apparatus of clause 14 wherein generating the V-PCC bitstream based on the V-PCC image and the base-mesh coding utilizes the connectivity information per patch.
27. A system comprising:
one or more cameras for acquiring three dimensional content; and
an encoder for encoding the three dimensional content by:
performing mesh voxelization on an input mesh of the three dimensional content;
implementing patch generation which segments the mesh into patches including a rasterized mesh surface and vertices location and connectivity information;
generating a video-based point cloud compression (V-PCC) image from the rasterized mesh surface;
implementing base-mesh coding with the vertices location and connectivity information; and
generating a V-PCC bitstream based on the V-PCC image and the base-mesh coding.
28. The system of clause 27 wherein mesh voxelization includes shifting and/or scaling mesh values to avoid negative values and non-integer values.
29. The system of clause 28 wherein mesh voxelization includes finding a lowest vertex value below zero and shifting the mesh values so the lowest vertex value is above zero.
30. The system of clause 27 wherein implementing patch generation includes calculating a normal per triangle.
31. The system of clause 30 wherein calculating the normal of the triangle includes using a cross-product between edges.
32. The system of clause 30 wherein the encoder is further for categorizing triangles according to the normals.
33. The system of clause 30 wherein the encoder is further for implementing a refinement process by analyzing neighboring triangles.
34. The system of clause 27 wherein base-mesh coding includes encoding (u,v) coordinates of vertices.
35. The system of clause 27 wherein generating the V-PCC bitstream includes base-mesh signaling and utilizes a multi-layer implementation.
36. The system of clause 35 wherein a first layer in the multi-layer implementation includes a raw point cloud, a second layer in the multi-layer implementation includes a sparse mesh, and a third layer in the multi-layer implementation includes a dense mesh.
37. The system of clause 27 wherein the encoder is further configured for generating a base mesh including additional connectivity data for each patch, wherein a decoder determines whether to utilize the additional connectivity data, further wherein the additional connectivity data improves rendering and point filtering.
38. The system of clause 27 wherein the connectivity information is encoded based on color codes.

39. The system of clause 27 wherein generating the V-PCC bitstream based on the V-PCC image and the base-mesh coding utilizes the connectivity information per patch.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a
device comprising:
performing mesh voxelization on an input mesh to generate a voxelized mesh;
implementing patch generation which segments the voxelized mesh into patches including a rasterized mesh surface and vertices location and connectivity information, wherein implementing patch generation includes calculating a normal per triangle, wherein calculating the normal of the triangle includes using a cross-product between edges;
categorizing each triangle according to the normal;
implementing a refinement process by analyzing neighboring triangles including determining if a number of neighboring triangles is above a threshold;
generating a video-based point cloud compression (V-PCC) image from the rasterized mesh surface;
implementing base-mesh coding with the vertices location and connectivity information; and
generating a V-PCC bitstream based on the V-PCC image and the base-mesh coding.

2. The method of claim 1 wherein mesh voxelization includes shifting and/or scaling mesh vertex coordinate values to avoid negative values and non-integer values.

3. The method of claim 2 wherein mesh voxelization includes finding a lowest vertex coordinate value below zero and shifting the mesh vertex coordinate values so the lowest vertex coordinate value is above zero.

4. The method of claim 1 wherein base-mesh coding includes encoding (u,v) coordinates of vertices.

5. The method of claim 1 wherein generating the V-PCC bitstream includes base-mesh signaling and utilizes a multi-layer implementation.

6. The method of claim 5 wherein a first layer in the multi-layer implementation includes a raw point cloud, a second layer in the multi-layer implementation includes a sparse mesh, and a third layer in the multi-layer implementation includes a dense mesh.

7. The method of claim 1 further comprising generating a base mesh including additional connectivity data for each patch, wherein a decoder determines whether to utilize the additional connectivity data, further wherein the additional connectivity data improves rendering and point filtering.

8. The method of claim 1 wherein the connectivity information is encoded based on color codes.

9. The method of claim 1 wherein generating the V-PCC bitstream based on the V-PCC image and the base-mesh coding utilizes the connectivity information per patch.

10. An apparatus comprising:
a non-transitory memory for storing an application, the application for:
performing mesh voxelization on an input mesh to generate a voxelized mesh;
implementing patch generation which segments the voxelized mesh into patches including a rasterized mesh surface and vertices location and connectivity information, wherein implementing patch generation includes calculating a normal per triangle, wherein calculating the normal of the triangle includes using a cross-product between edges;
categorizing each triangle according to the normal;
implementing a refinement process by analyzing neighboring triangles including determining if a number of neighboring triangles is above a threshold;
generating a video-based point cloud compression (V-PCC) image from the rasterized mesh surface;
implementing base-mesh coding with the vertices location and connectivity information; and
generating a V-PCC bitstream based on the V-PCC image and the base-mesh coding; and
a processor coupled to the memory, the processor configured for processing the application.

11. The apparatus of claim 10 wherein mesh voxelization includes shifting and/or scaling mesh vertex coordinate values to avoid negative values and non-integer values.

12. The apparatus of claim 11 wherein mesh voxelization includes finding a lowest vertex coordinate value below zero and shifting the mesh vertex coordinate values so the lowest vertex coordinate value is above zero.

13. The apparatus of claim 10 wherein base-mesh coding includes encoding (u,v) coordinates of vertices.

14. The apparatus of claim 10 wherein generating the V-PCC bitstream includes base-mesh signaling and utilizes a multi-layer implementation.

15. The apparatus of claim 14 wherein a first layer in the multi-layer implementation includes a raw point cloud, a second layer in the multi-layer implementation includes a sparse mesh, and a third layer in the multi-layer implementation includes a dense mesh.

16. The apparatus of claim 10 wherein the application is further for generating a base mesh including additional connectivity data for each patch, wherein a decoder determines whether to utilize the additional connectivity data, further wherein the additional connectivity data improves rendering and point filtering.

17. The apparatus of claim 10 wherein the connectivity information is encoded based on color codes.

18. The apparatus of claim 10 wherein generating the V-PCC bitstream based on the V-PCC image and the base-mesh coding utilizes the connectivity information per patch.

19. A system comprising:
one or more cameras for acquiring three dimensional content; and
an encoder for encoding the three dimensional content by:
performing mesh voxelization on an input mesh of the three dimensional content to generate a voxelized mesh;
implementing patch generation which segments the voxelized mesh into patches including a rasterized mesh surface and vertices location and connectivity information, wherein implementing patch generation includes calculating a normal per triangle, wherein calculating the normal of the triangle includes using a cross-product between edges;
categorizing each triangle according to the normal;
implementing a refinement process by analyzing neighboring triangles including determining if a number of neighboring triangles is above a threshold;

generating a video-based point cloud compression (V-PCC) image from the rasterized mesh surface;

implementing base-mesh coding with the vertices location and connectivity information; and generating a V-PCC bitstream based on the V-PCC image and the base-mesh coding.

20. The system of claim 19 wherein mesh voxelization includes shifting and/or scaling mesh vertex coordinate values to avoid negative values and non-integer values.

21. The system of claim 20 wherein mesh voxelization includes finding a lowest vertex coordinate value below zero and shifting the mesh vertex coordinate values so the lowest vertex coordinate value is above zero.

22. The system of claim 19 wherein base-mesh coding includes encoding (u,v) coordinates of vertices.

23. The system of claim 19 wherein generating the V-PCC bitstream includes base-mesh signaling and utilizes a multi-layer implementation.

24. The system of claim 23 wherein a first layer in the multi-layer implementation includes a raw point cloud, a second layer in the multi-layer implementation includes a sparse mesh, and a third layer in the multi-layer implementation includes a dense mesh.

25. The system of claim 19 wherein the encoder is further configured for generating a base mesh including additional connectivity data for each patch, wherein a decoder determines whether to utilize the additional connectivity data, further wherein the additional connectivity data improves rendering and point filtering.

26. The system of claim 19 wherein the connectivity information is encoded based on color codes.

27. The system of claim 19 wherein generating the V-PCC bitstream based on the V-PCC image and the base-mesh coding utilizes the connectivity information per patch.

* * * * *